Nov. 11, 1941.   J. P. BADENHAUSEN   2,262,420
COMBUSTION AND CHEMICAL RECOVERY FURNACE AND METHOD OF OPERATING THE SAME
Original Filed Jan. 23, 1937    3 Sheets-Sheet 1

Inventor:
John Phillips Badenhausen,
By B.T. Wobensmith 2nd
Attorney.

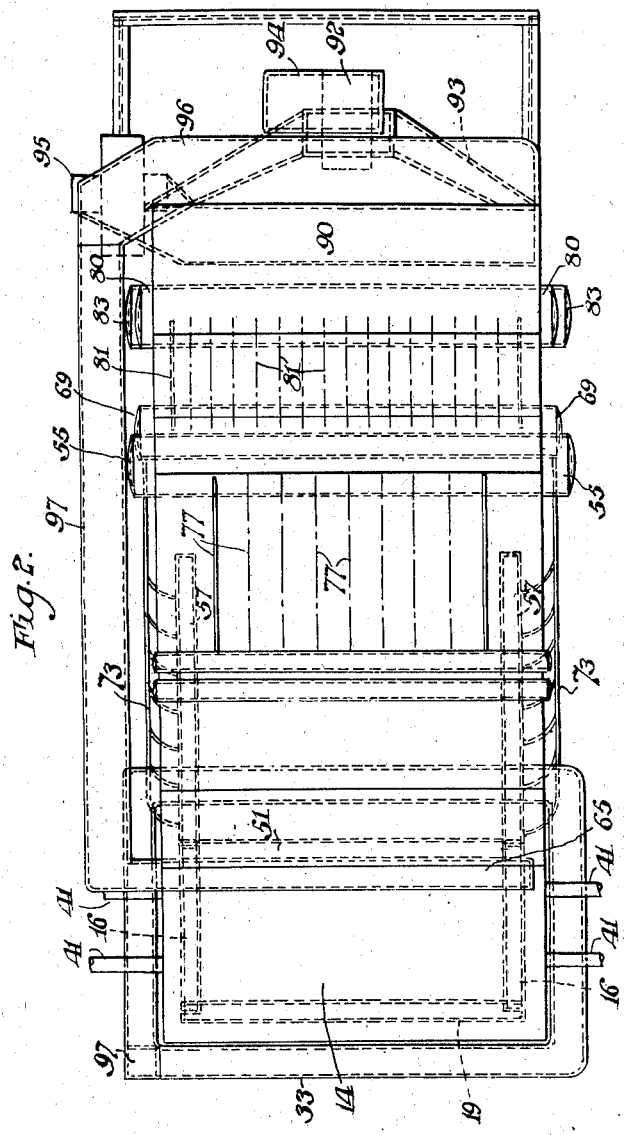

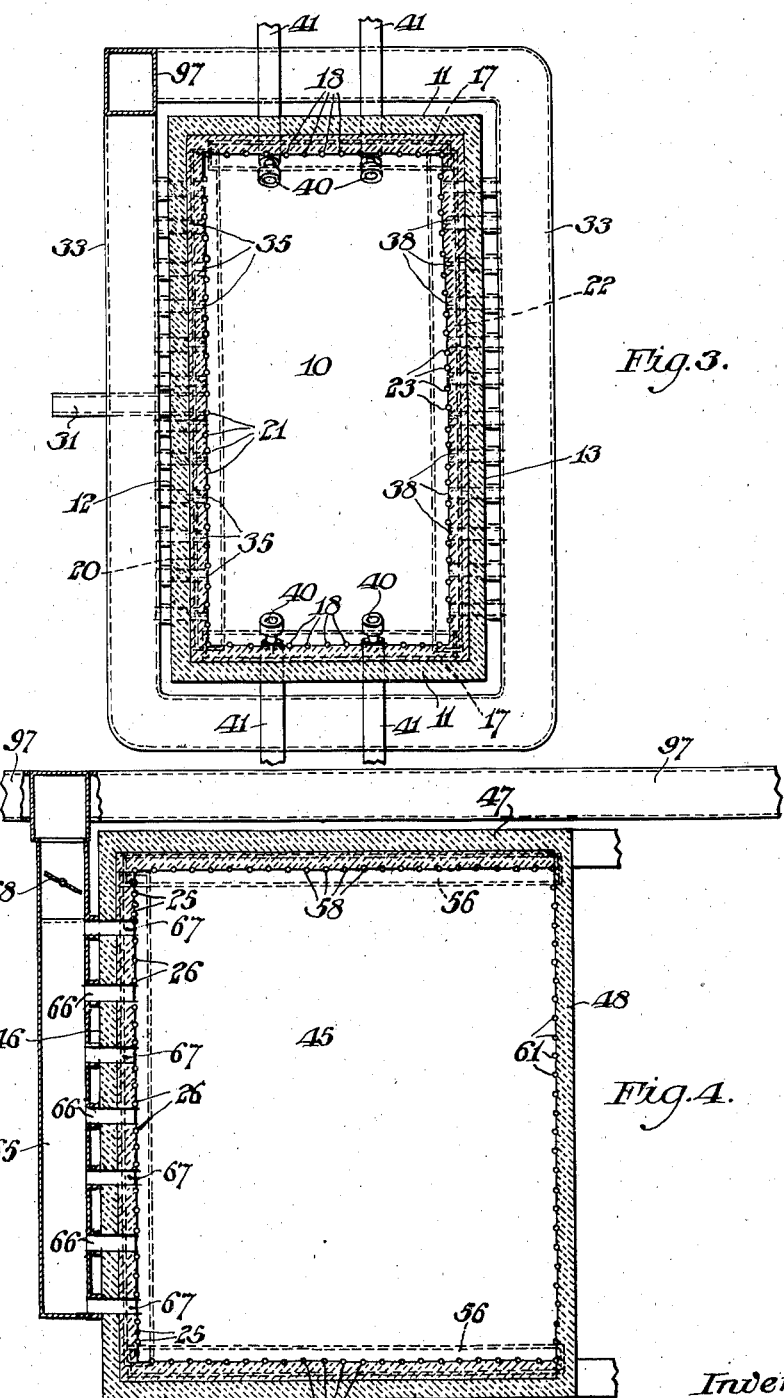

Patented Nov. 11, 1941

2,262,420

UNITED STATES PATENT OFFICE 2,262,420

COMBUSTION AND CHEMICAL RECOVERY FURNACE AND METHOD OF OPERATING THE SAME

John Phillips Badenhausen, Philadelphia, Pa., assignor of one-half to Day and Zimmermann, Incorporated, Philadelphia, Pa., a corporation of Maryland Application January 23, 1937, Serial No. 121,974
Renewed January 24, 1940

9 Claims. (Cl. 23—48)

This invention relates to furnaces and methods of operating the same, and more particularly to furnaces for the combustion of waste liquor from industrial plants and the recovery from such liquor or valuable chemicals, the apparatus being so constructed, arranged and operated that the available heat of the combustibles contained in the waste material supplied to the furnace is advantageously utilized for carrying on the recovery operation and for generating steam, and an increased recovery of the chemicals in the waste liquor is obtained.

The invention further relates to improved methods of burning the combustible material contained in black or waste liquor from paper pulp mills and to improved methods of recovery of the chemicals in such liquor.

With the furnaces heretofore available, as well as with the methods heretofore employed in the treatment of waste liquor from pulp mills a considerable quantity of the chemicals, including the sodium salts, was carried beyond the furnace by the products of combustion and deposited in the boiler space or on the induced draft fan, or in some instances it passed out the stack. With such systems it has been necessary, at frequent intervals, to shut down the operation of the unit, and clean or replace the fan rotor as well as clean the spaces in the boiler where the chemicals have deposited. This stopping, and also the failure to recover the highest possible quantity of chemicals has prevented the attainment of the optimum desired in the operation of systems for combustion and chemical recovery.

There have also been serious limitations in the sizes of the units which could be constructed and operated in accordance with the systems heretofore known.

It is an object of the present invention, therefore, to provide a combustion and chemical recovery furnace construction, and methods of operation thereof, which will overcome the difficulties heretofore encountered, and which can not only be operated continuously, efficiently, and without interruption, but may be built with greater capacity than has heretofore been possible.

It is also an object of the present invention to provide a furnace construction in which substantially complete combustion of the combustible material in the black liquor will be effected, and in which the yield of sodium salts recovered in the operation of the unit will be increased.

It is a further object of the invention to provide an improved process for treating the black liquor in the combustion of the combustible material therein so that the recovery yield of sodium salts will be increased.

It is a further object of the invention to provide an improved apparatus for the combustion of the combustibles in black liquor which includes a plurality of separate chambers, with one chamber being suitably constructed for returning to another chamber the chemicals depositing therein.

Other objects of the invention will appear from the annexed specification and claims.

The nature and characteristic features of the invention will be more readily understood from the following description, taken in connection with the accompanying drawings forming part hereof, in which:

Fig. 2 is a top plan view of the apparatus shown in Fig. 1, showing certain features of the device;

Fig. 3 is a horizontal sectional view taken approximately on the line 3—3 of Fig. 1 and showing certain of the details of construction of one of the furnace chambers; and Fig. 4 is a horizontal sectional view taken approximately on the line 4—4 of Fig. 1 and showing certain of the details of construction of another of the furnace chambers.

Figure 1:
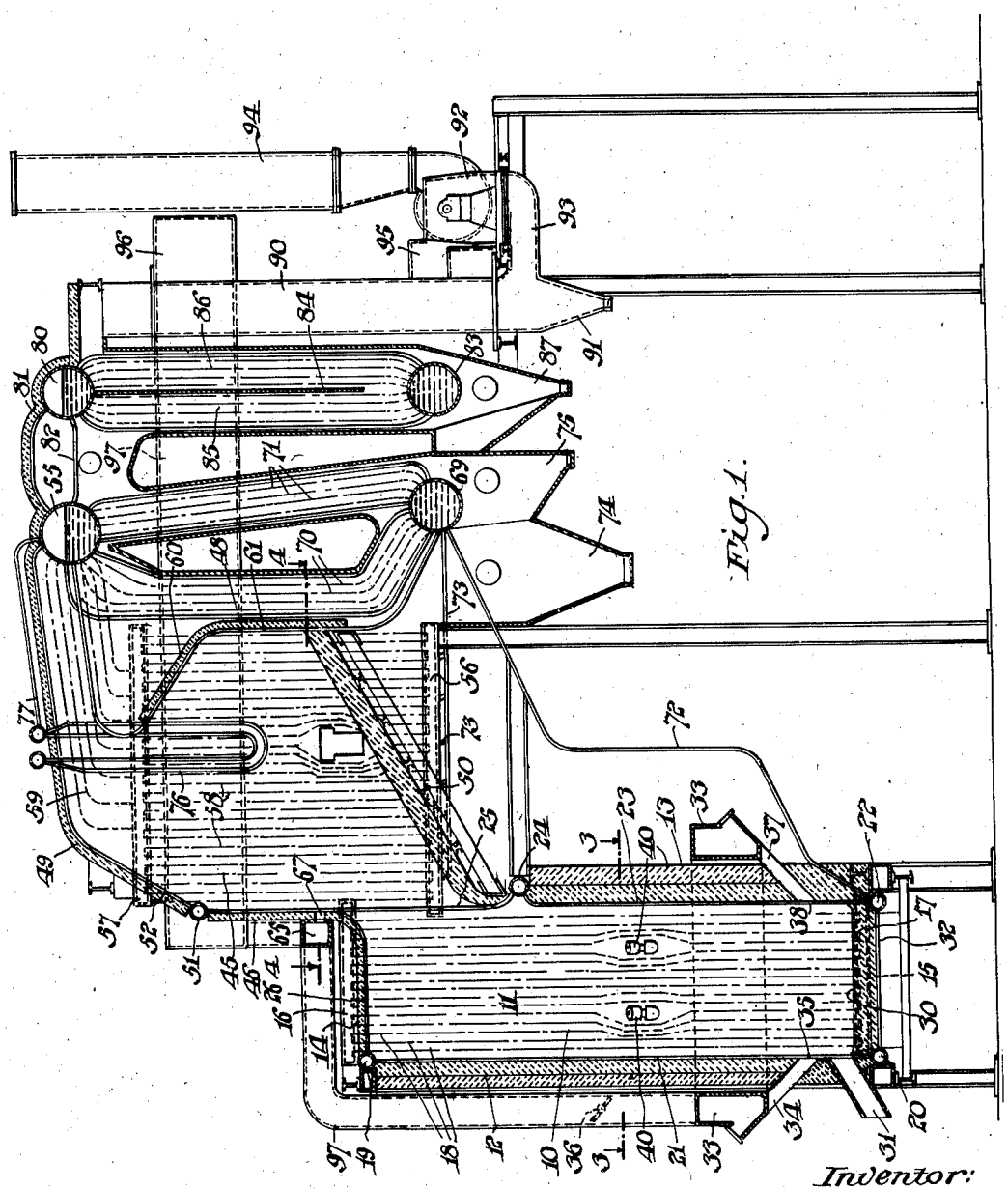
Figure 1 is a vertical central sectional view taken from the front to the back of a preferred embodiment of the apparatus of the present invention.

It will, of course, be understood that the drawings and description herein contained are illustrative merely, and that various modifications and changes may be made in the structure and methods disclosed without departing from the spirit of the invention.

Referring more particularly to the drawings it will be seen that there is provided a furnace chamber 10 which operates as a smelter chamber, into which the concentrated waste liquor is adapted to be sprayed, into which air, preferably preheated, is supplied, from which gases at high temperature pass to another chamber, and from which the recovered chemicals in fused condition are withdrawn, as hereinafter more fully pointed out.

The walls of the furnace chamber 10 are water cooled, the heat extracted from the furnace chamber 10 by the water cooling tubes serving to prevent excessive temperatures in the walls, and also providing, in combination with the steam generating section, for more efficient generation of steam.

The furnace chamber 10 preferably comprises two side walls 11, a front wall 12, a rear wall 13, a top wall 14 and a bottom wall 15.

The side walls 11 are each provided, near the top thereof, with an upper header 16 and near the bottom thereof with a lower header 17, the headers 16 and 17 being connected by a bank of tubes 18 which is exposed to the radiant heat within the furnace chamber 10.

The front wall 12 is provided near the top thereof with an upper header 19 and near the bottom thereof with a lower header 20, the headers 19 and 20 being connected by a bank of tubes 21 also exposed to the radiant heat of combustion.

The side walls 11 and the front wall 12 of the furnace chamber 10 are substantially of the same vertical extent to provide a chamber which is relatively high and also relatively broad.

The upper portion of the rear wall 13 is spaced from the top wall 14 to provide for the passage from the furnace chamber 10 of hot gases and the return thereto of partially or completely treated chemicals, as hereinafter more fully set forth.

The rear wall 13, which extends downwardly to the bottom wall 15, is provided with a lower header 22 near the bottom thereof from which a bank of tubes 23 extends upwardly to an upper header 24, from which a bank of tubes 25 arranged near the side walls 11 extend upwardly, as hereinafter more fully pointed out. The top wall 14 of the furnace chamber 10 is also provided with a bank of tubes 26 which extend from the upper header 19, as will be hereinafter more fully referred to.

The bottom wall 15 of the chamber 10 is formed as a collecting hearth or crucible space 30, lined with refractory material along the bottom, and upwardly along the sides. A spout 31 is provided for the withdrawal of molten chemicals collecting or depositing on the collecting hearth 30.

Beneath the refractory lined bottom wall 15 a bank of tubes 32 is provided between the lower headers 20 and 22.

Suitable provision is made for introducing air, preferably preheated, into the furnace chamber 10 in the lower portion thereof and preferably above the floor 15. A duct 33 extending horizontally around the chamber 10 is mounted on the exterior of the furnace chamber 10 and from this duct 33 suitable small ducts 34 lead to slots or openings 35 in the interior of the front wall 12 of the furnace chamber 10, these slots 35 being located between tubes of the bank of tubes 21. Suitable flow control dampers 36 may be provided. The air duct 33 extends along the exterior of the rear wall 13 of the furnace chamber 10 which is provided with a plurality of small ducts 37, which extend between tubes of the bank of tubes 23 to slots or openings 38 in the interior face of the rear wall 13. The structure for introducing air through the rear wall 13 is substantially the same as the structure for introducing air through the front wall 12.

Suitable provision is made for spraying the waste fluid into the furnace chamber 10. The waste fluid material for introduction into the furnace has certain characteristics, i. e. it contains combustible organic material, both volatile and non-volatile, combustible inorganic matter, chemicals to be recovered, and water. The apparatus of the present invention, and the methods employed, are intended primarily for concentrated black liquor derived as waste from the cellulosic or woody fibre separation processes of paper pulp or kraft mills, but they are also suitable for the treatment of other waste fluids, such as distillery wastes, having the characteristics referred to.

The structure for spraying the black liquor or similar material preferably takes the form of a plurality of upwardly directed inclined nozzles 40 mounted within the chamber 10 and to which the fluid is supplied by suitable supply pipes 41 which extend through the side walls 11. These nozzles 40 are located in the furnace chamber 10 below the middle thereof, so that the material to be burned is introduced in the lower portion of the furnace chamber 10 and directed and sprayed into the upper portion of this chamber. As the sprayed material is introduced into the space provided by the furnace chamber 10, all of the surfaces of the sprayed particles are brought into intimate contact with the upwardly moving gaseous stream, and said particles are thereby subjected to the heat and free oxygen within the stream as the said particles descend toward the floor of the furnace, and contact of the sprayed particles with the side walls of the furnace chamber 10 is avoided as far as possible.

An additional furnace chamber 45 is provided which serves as an auxiliary smelting chamber, a settling chamber and a combustion chamber. The furnace chamber 45 is located above and to the rear of the upper extremity of the rear wall 13 of the furnace chamber 10.

The additional furnace chamber 45 comprises a front wall 46, side walls 47, a rear wall 48, a top wall or ceiling 49, and a bottom wall 50. The walls of the furnace chamber 45 are preferably provided with water cooling and steam generating tubes, as hereinafter more fully pointed out.

The front wall 46 of the chamber 45 is provided with a header 51 to which the bank of tubes 26 is connected, the tubes of this bank being connected at their lower ends to the header 19. The banks of tubes 25 extending upwardly from the header 24 are also connected to this header 51. A bank of tubes 52 extends along the upper part of the front wall 46, and along the top wall 49 to an upper steam and water drum 55.

The side walls 47 are preferably each provided with a lower header 56 near the bottom thereof, and with an upper header 57 near the top thereof, between which a bank of tubes 58 extends. The uppermost portions of the side walls 47 are provided with a bank of tubes 59 which extends from the upper header 57 to the steam and water drum 55.

The bottom wall 50 of the additional furnace chamber 45 is preferably made of refractory material inclined downwardly toward the front of the chamber 45 at an angle such as to direct and discharge the molten or other material depositing thereon back into the furnace chamber 10.

The rear wall 48 of the chamber 45 is preferably composed of a baffle with an upwardly extending portion and a forwardly inclined portion 60. The rear wall 48 is provided with a bank of tubes 61 which extends to the upper steam and water drum 55 and prevents the wall 48 attaining an excessive and destructive temperature.

Suitable provision is made for introducing air, preferably preheated, into the furnace chamber 45 and for this purpose the front wall 46 of the chamber 45 is provided on the exterior thereof with a horizontally extending air duct 65. Suitable smaller ducts 66 lead therefrom to slots 67 in the inside of the front wall 46, between the tubes of the bank of tubes 26. A suitable control damper as at 68 for controlling the quantity of air delivered through the slots 67 may also be provided.

The steam generating structure includes the headers and banks of tubes previously mentioned in connection with the furnace chamber 10 and the additional furnace chamber 45 and preferably includes also a boiler section which may be of any desired construction. The preferred embodiment of the boiler section includes the upper steam and water drum 55, hereinbefore referred to, and a lower water drum 69 disposed below the drum 55. The boiler section has two passes, a bank of riser tubes 70 being arranged in one pass of the boiler section between the drums 55 and 69, and a bank of downcomer tubes 71 being arranged in the other pass of the boiler section between the drum 55 and the drum 69. An additional bank of riser tubes 61 extends from the lower drum 69 along the vertical portion and the inclined portion 60 of the rear wall 48 into the throat or passageway at the upper portion of the furnace chamber 45 and thence to the upper steam and water drum 55. A bank of downcomer tubes 72 extends from the water drum 69 to the lower header 22 and an additional bank of tubes 73 extends from the water drum 69 to the lower headers 56.

The lower portion of the boiler section may be provided with suitable hoppers 74 and 75 for the collection and removal of any solid or molten material carried from the furnace chamber 45 into the boiler section and falling therein.

A superheater 76 is preferably also employed and extends downwardly across the passageway leading from the furnace chamber to the boiler section and extends into the central portion of the furnace chamber 45. The superheater 76 is connected by a suitable pipe 77 to the steam and water drum 55.

The steam generating structure preferably includes also an economizer arranged to the rear of the boiler section and having two passes. The economizer has an upper drum 80 which is connected to the upper steam and water drum 55 of the boiler section by a bank of tubes 81 which lines the upper wall of the passageway connecting the second pass of the boiler section to the economizer section and connects the drums 55 and 80 above the water line. An additional bank of tubes 82 connects the drums 55 and 80 below the water line.

The economizer also has a lower drum 83 arranged below the upper drum 80. A baffle 84 extends downwardly from the upper drum 80 to a location spaced above the lower drum 83, and this baffle 84 separates the tubes extending between the drum 80 and the drum 83 into a bank of riser tubes 85 and a bank of downcomer tubes 86.

The economizer may have, at the bottom thereof, a suitable hopper 87 for the collection of any material falling thereinto.

An air heater 90 is provided for preheating the air which is supplied through the slots 35 and 38 to the furnace chamber 10 and through the slots 67 to the furnace chamber 45. The air heater 90 is arranged to the rear of the economizer section for receiving the hot gases therefrom and is provided with suitable heat exchanging surfaces, which may take the form of tubes, the air being brought in contact with one side thereof and the hot gases with the other side thereof in a well known manner. The air heater 90 may also have a suitable hopper 91 at the bottom thereof for the removal of any material which falls thereinto.

An induced draft fan 92 is provided, between the gas duct 93, which leads from the air heater 90, and a stack 94. A forced draft fan 95 is also provided for supplying air under pressure to the air heater 90 and thence after preheating through air ducts 96 and 97 to the ducts 33 and 65 for introduction into the furnace chamber 10 and the additional furnace chamber 45, respectively.

The mode of operation of the structure herein disclosed and the method of recovering waste heat and chemicals by the operation thereof will now be set forth.

Before the system is operated in the desired manner, it is necessary that the furnace chamber 10 and the furnace chamber 45 be preheated and brought to a temperature such that continuous operation may be effected without the necessity for supplying fuel to the system in addition or auxiliary to the combustibles supplied in and by the waste liquid.

The black liquor previously concentrated in suitable apparatus (not shown) is sprayed upwardly into the furnace chamber 10. The air introduced into the furnace chamber 10 also moves upwardly. The hot gases entering the additional furnace chamber 45 and the air supplied to this chamber 45 are also introduced so as to provide an advancing movement, through the system, of the gaseous materials. The only substantial movement in opposition to the stream or current of the gases is the movement of the chemicals to be recovered which, by reason of their mass, settle and are deposited on the refractory lined bottom wall 30.

Preheated air from the preheater 90 is supplied to the lower portion of the furnace chamber 10 at the front thereof through the duct 33, the smaller ducts 34 and the slots 35, and at the rear thereof through the duct 33, the smaller ducts 37 and the slots 38. The quantity of air supplied at the lower portion of the furnace chamber 10 may be regulated as desired by the damper 36 to provide and maintain the desired quantity of combustion supporting oxygen within the furnace chamber 10.

The concentrated waste liquor supplied through the supply pipes 41 to the nozzles 40 is sprayed upwardly by the nozzles 40 from the lower portion of the furnace chamber 10 and is directed by the spraying into the upper portion of the furnace chamber 10.

The purpose of the spraying of the black liquor in this manner is to vaporize the water content remaining after concentration, to volatilize the volatile constituents of the black liquor and to initiate the separation or splitting up for burning and the burning of the combustible organic constituents of the black liquor.

The first stage or step in the operation of the system causes the separation out of a substantial portion of the chemicals, such as sodium or potassium salts, to be recovered, and the settling and deposition in a molten state on the refractory lined bottom wall 30 in a condition suitable for withdrawal by the spout 31 from the furnace.

The hot gaseous fluids passing from the furnace chamber 10 to the additional furnace chamber 45 contain volatile combustibles and a quantity of the chemicals desired to be recovered.

These hot gaseous fluids supplied or directed into the furnace chamber 45 have additional preheated air supplied thereto from the preheater 90 through the duct 65 on the exterior of the front wall 46 of the furnace chamber 45 through the smaller ducts 66, and the slots 67 into the interior of the chamber 45.

The supply of air to the additional furnace chamber 45 is regulated and controlled as desired, for example, by means of the damper 68, and particularly so that substantially complete combustion of any unconsumed combustible materials introduced into this chamber is effected.

In the furnace chamber 45 also, by reason of the completeness of the combustion, the remaining portions of the chemicals to be recovered, which failed to separate out in the furnace chamber 10 separate out in the furnace chamber 45. These chemicals deposit on the inclined floor 50 of the chamber 45 which directs the material, in molten as well as in flaky form, back into the furnace chamber 10. This return to the furnace chamber 10 aids additionally in the combustion of any combustible materials which remained in association with the chemicals. The chemicals thus previously separated upon their return to the furnace chamber 10, pass downwardly through the advancing stream of hot gases and deposit on the bottom wall 30 with the chemicals separated out in the furnace chamber 10.

It is to be noted that the furnace chamber 45, by reason of its position and shape, with the upper portion of the rear wall inclined, maintains a turbulence within the chamber 45. This turbulence brings the particles of unconsumed combustible material into intimate contact with the air introduced into the furnace chamber 45 through the slots 67.

The hot gases substantially free from the chemicals desired to be recovered pass out the top of the furnace chamber 45 and to the boiler section.

In the boiler section the hot gases pass downwardly in contact with the bank of riser tubes 70 of the boiler section, then upwardly in contact with the downcomer tubes 71 of the boiler section, and thence into the economizer section.

In the economizer section the partially cooled gases pass downwardly in contact with the riser tubes 85, around the lower edge of the baffle 84, then upwardly in contact with the downcomer tubes 86, and thence into the air preheater 90. In the air preheater 90 the gases pass downwardly in contact with the heat exchange surfaces thereof, then through the duct 93, the induced draft fan 92 and thence into the stack 94 for discharge.

While it is desired to recover the chemicals in molten form and free from combustible material, through the spout 31, any small quantities of the chemicals which are carried beyond the furnace chamber 45 are precipitated upon the cooling of the gases by the absorption of heat therefrom in the boiler section, in the economizer section, and in the air heater. The small quantities of chemicals thus settling out may be removed from the hoppers 74, 75, 87 and 93 without interfering with the continuous operation of the system.

It will be noted that with the operation of the system of the present invention, the introduction of the waste liquor, the introduction of the air from the duct 33 and the introduction of the air from the duct 85, is in an advancing direction and that the only substantial counter-flow or movement in opposition to the stream of gases is the movement to the hearth 30 of the chemicals to be recovered after the same have been separated from the liquor.

It will be noted also that the height and size of the chamber 10 are such that sufficient time is available for dehydration and volatilization in the furnace chamber 10, and that the additional furnace chamber 45 is of a size which permits of substantially complete combustion of the combustible material.

I claim:

1. The process of recovering heat and chemicals in a multiple chamber furnace from waste liquid containing combustible constituents and chemicals to be recovered which comprises spraying the liquid upwardly into a zone of a furnace chamber substantially free from contact of the liquid with the furnace chamber walls, supplying air to said zone for partial combustion of the combustible constituents in said zone and separation by said combustion of part of the recoverable chemicals in molten form, collecting the chemicals thus separated, advancing the gaseous stream to a zone in a second furnace chamber separated from said other zone, supplying air to the second chamber zone for completing the combustion therein of the combustible constituents and recovering additional chemicals, collecting the additional chemicals and withdrawing the recovered chemicals.

2. The process of recovering heat and chemicals in a multiple chamber furnace from waste liquid containing combustible constituents and chemicals to be recovered which comprises spraying the liquid upwardly into an upper zone of a furnace chamber, supplying air to said upper zone from below for partial combustion of the combustibles in said upper zone, collecting recovered chemicals below said upper zone, advancing the gaseous stream to a zone in a second furnace chamber separated from said upper zone, supplying air to the second chamber zone for completing combustion therein of the combustible constituents, collecting recoverable chemicals in said second chamber zone, and withdrawing the chemicals from the first chamber.

3. The process of recovering heat and chemicals in a multiple chamber furnace from waste liquid containing combustible constituents and chemicals to be recovered which comprises spraying the liquid upwardly into a zone of a furnace chamber, supplying air to said zone for partial combustion of the combustibles in said zone, separating recoverable chemicals by said combustion and collecting these chemicals in molten form, advancing the gaseous stream to a zone in a second furnace chamber separated from said other zone, supplying air to the second chamber zone for completing combustion of the combustible constituents, separating additional recoverable chemicals by said combustion in said second chamber zone, and withdrawing the recovered chemicals.

4. A waste heat and chemical recovery furnace for the treatment of waste liquid containing combustible constituents and chemicals to be recovered comprising a furnace chamber, means for spraying waste liquid upwardly into the upper portion of said furnace chamber, means for supplying air to said furnace chamber for partial combustion in said chamber of the combustibles, a second furnace chamber in communication with said first furnace chamber for receiving fluids at high temperature from said first furnace chamber, means for supplying air to said second furnace chamber for completing the combustion of the combustible portions of the fluids passing into said chamber from said first furnace chamber, means in said second chamber for collecting and returning to the first furnace chamber non-gaseous materials including chemicals to be recovered, and means in said first furnace chamber for collecting in molten form the chemicals to be recovered.

5. A waste heat and chemical recovery furnace for the treatment of waste liquid containing combustible constituents and chemicals to be recovered comprising a furnace chamber, means in the lower portion of said chamber for spraying waste liquid upwardly into the upper portion of said furnace chamber, means for supplying air at the lower portion of said furnace chamber for partial combustion in said chamber of the combustiles, a second furnace chamber in communication with said first furnace chamber for receiving gaseous fluids at high temperature from said first furnace chamber, means for supplying air into said second furnace chamber for completing the combustion of the combustible portions of the gaseous fluids passing into said chamber from said first furnace chamber, means in said second chamber for collecting and returning to the first furnace chamber non-gaseous materials including chemicals to be recovered, and means in the lower portion of the first furnace chamber for collecting the chemicals in molten form.

6. A waste heat and chemical recovery furnace for the treatment of waste liquid containing combustible constituents and chemicals to be recovered comprising a furnace chamber, means in the lower portion of said chamber for spraying waste liquid upwardly into the upper portion of said furnace chamber, means for supplying air at the lower portion of said furnace chamber for partial combustion in said chamber, a second furnace chamber in communication with said first furnace chamber for receiving gaseous fluids at high temperature from said first furnace chamber, means for supplying air into the lower portion of said second furnace chamber for completing the combustion of the combustible portions of the gaseous fluids passing into said chamber from said first furnace chamber, means in said second chamber for collecting and returning to the first furnace chamber non-gaseous materials including chemicals to be recovered, and means in the first furnace chamber for collecting the chemicals in molten form.

7. Apparatus for the recovery of heat and chemicals from waste liquids containing combustibles and recoverable chemicals comprising a first furnace chamber having a plurality of enclosing walls, means mounted in the lower portion of one of the walls for supplying waste liquid upwardly into said furnace chamber, means in the lower portion of one of the walls of said chamber for supplying air for partial combustion and recovery of chemicals in said chamber, means at the bottom of said chamber providing a collecting space for the chemicals to be recovered, a second furnace chamber having a plurality of enclosing walls, the walls of the furnace chambers having openings for providing communication between said furnace chambers, means in a wall of said second furnace chamber for supplying air into said second furnace chamber for completing combustion of the combustibles of the waste liquid, the bottom wall of said second furnace chamber being inclined downwardly in the direction of said first furnace chamber for returning to said first furnace chamber non-gaseous materials depositing on said bottom wall.

8. Apparatus for the recovery of heat and chemicals from waste liquids containing combustibles and recoverable chemicals comprising a first furnace chamber having a plurality of enclosing walls, banks of tubes for cooling said walls and for generating steam, means for supplying waste liquid upwardly into said furnace chamber, means for supplying air to said furnace chamber for partial combustion and recovery of chemicals, means at the bottom of said chamber providing a collecting space for the chemicals to be recovered, a second furnace chamber having a plurality of enclosing walls, banks of tubes for cooling said walls and for generating steam, the walls of said furnace chambers having openings for providing communication between said furnace chambers, and means in a wall of said second furnace chamber for supplying air to said second furnace chamber for completing combustion of the combustibles of the waste liquid.

9. Apparatus for the recovery of heat and chemicals from waste liquids containing combustibles and recoverable chemicals comprising a first furnace chamber, means for supplying waste liquid upwardly into the upper part of said furnace chamber, means in the lower part of said furnace chamber for supplying air to said furnace chamber for partial combustion and recovery of chemicals, means at the bottom of said chamber providing a collecting space for the chemicals to be recovered, a second furnace chamber, the furnace chambers having openings for providing communication between said furnace chambers, means in the lower part of said second furnace chamber for supplying air to said second furnace chamber for completing combustion of the combustibles of the waste liquid, the bottom wall of said second furnace chamber being inclined downwardly in the direction of said first furnace chamber for returning to said first furnace chamber non-gaseous materials depositing on said bottom wall.

JOHN PHILLIPS BADENHAUSEN.